(12) United States Patent
Litvak et al.

(10) Patent No.: US 12,502,541 B2
(45) Date of Patent: Dec. 23, 2025

(54) DEVICE FOR ASSESSMENT OF BRAIN SIGNALS

(71) Applicant: Medtronic, Inc., Minneapolis, MN (US)

(72) Inventors: Leonid M. Litvak, Los Angeles, CA (US); Steven M. Goetz, North Oaks, MN (US); Christopher L. Pulliam, Plymouth, MN (US); Scott R. Stanslaski, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 1012 days.

(21) Appl. No.: 17/578,254

(22) Filed: Jan. 18, 2022

(65) Prior Publication Data
US 2022/0266023 A1 Aug. 25, 2022

Related U.S. Application Data

(60) Provisional application No. 63/152,911, filed on Feb. 24, 2021.

(51) Int. Cl.
*A61N 1/36* (2006.01)
*A61N 1/372* (2006.01)

(52) U.S. Cl.
CPC ....... *A61N 1/36132* (2013.01); *A61N 1/3606* (2013.01); *A61N 1/36135* (2013.01); *A61N 1/37235* (2013.01)

(58) Field of Classification Search
CPC .... A61N 1/36; A61N 1/3606; A61N 1/36132; A61N 1/36135; A61N 1/37235
See application file for complete search history.

(56) References Cited

U.S. PATENT DOCUMENTS

| | | | |
|---|---|---|---|
| 2009/0082640 A1 | 3/2009 | Kovach et al. | |
| 2009/0082829 A1* | 3/2009 | Panken | A61N 1/36139 607/45 |
| 2009/0264956 A1* | 10/2009 | Rise | A61B 5/165 607/45 |

(Continued)

FOREIGN PATENT DOCUMENTS

| WO | 2019178271 A1 | 9/2019 |
|---|---|---|
| WO | 2019211314 A1 | 11/2019 |

OTHER PUBLICATIONS

Response to Extended Search Report dated Jul. 21, 2022, from counterpart European Application No. 22158266.1 filed Feb. 14, 2023, 17 pp.

(Continued)

*Primary Examiner* — Christopher A Flory
(74) *Attorney, Agent, or Firm* — Shumaker & Sieffert, P.A.

(57) ABSTRACT

A method for assessment of brain signals of a patient includes determining, by one or more processors, a cluster of neural data occurring at a brain of the patient and outputting, by the one or more processors, a request for a user to provide patient state information for the cluster of the neural data in response to determining that the cluster of the neural data is occurring at the brain of the patient. The method further includes associating, by the one or more processors, the patient state information with the cluster of the neural data to generate patient assessment information and outputting, by the one or more processors, the patient assessment information.

20 Claims, 5 Drawing Sheets

(56) References Cited

U.S. PATENT DOCUMENTS

| | | | |
|---|---|---|---|
| 2010/0114237 A1* | 5/2010 | Giftakis | A61B 5/369 |
| | | | 607/45 |
| 2010/0280334 A1 | 11/2010 | Carlson et al. | |
| 2010/0280336 A1* | 11/2010 | Giftakis | A61B 5/4803 |
| | | | 600/301 |
| 2010/0280579 A1 | 11/2010 | Denison et al. | |
| 2011/0137371 A1* | 6/2011 | Giftakis | A61B 5/293 |
| | | | 607/45 |
| 2012/0116475 A1* | 5/2012 | Nelson | A61N 1/36082 |
| | | | 607/45 |
| 2013/0172774 A1* | 7/2013 | Crowder | G16H 40/63 |
| | | | 600/300 |
| 2013/0268019 A1* | 10/2013 | Gupta | A61N 1/36067 |
| | | | 607/45 |
| 2014/0213926 A1* | 7/2014 | Vaidyanathan | A61N 1/36135 |
| | | | 600/545 |
| 2016/0296759 A1* | 10/2016 | Cong | A61N 1/372 |
| 2018/0071530 A1* | 3/2018 | Giftakis | A61N 1/3614 |
| 2018/0085590 A1* | 3/2018 | Goetz | A61N 1/00 |
| 2020/0298012 A1 | 9/2020 | Jenison et al. | |
| 2020/0338350 A1 | 10/2020 | Panken et al. | |
| 2020/0397363 A1 | 12/2020 | Gu et al. | |
| 2022/0323766 A1* | 10/2022 | Hughes | G16H 20/40 |

OTHER PUBLICATIONS

Extended Search Report from counterpart European Application No. 22158266.1 dated Jul. 21, 2022, 7 pp.

Berger et al., "A Wearable New Technology Moves Brain Monitoring from the Lab to the Real World", MedicalXpress.com, University of Pennsylvania, Aug. 14, 2019, 4 pp., retrieved May 23, 2022 from https://medicalxpress.com/news/2019-08-wearable-technologybrain- lab-real.html.

* cited by examiner

DEVICE FOR ASSESSMENT OF BRAIN SIGNALS

This application claims the benefit of U.S. Provisional Patent Application 63/152,911, filed Feb. 24, 2021, the entire content of which is incorporated herein by reference.

TECHNICAL FIELD

This disclosure generally relates to assessment of brain signals, particularly in medical devices providing electrical stimulation therapy.

BACKGROUND

Medical devices may be external or implanted, and may be used to deliver electrical stimulation therapy to various tissue sites of a patient to treat a variety of symptoms or conditions such as chronic pain, tremor, Parkinson's disease, other movement disorders, epilepsy, urinary or fecal incontinence, sexual dysfunction, obesity, or gastroparesis. A medical device delivers electrical stimulation therapy via one or more leads that include electrodes located proximate to target locations associated with the brain, the spinal cord, pelvic nerves, peripheral nerves, or the gastrointestinal tract of a patent. For bipolar stimulation, the electrodes used for stimulation may be on one or more leads. For unipolar stimulation, the electrodes may be on one or more leads, and an electrode on a stimulator housing located remotely from the target site (e.g., near clavicle). It may be possible to use leadless stimulation using electrodes mounted on the stimulation housing. Hence, electrical stimulation is used in different therapeutic applications, such as deep brain stimulation (DBS), spinal cord stimulation (SCS), pelvic stimulation, gastric stimulation, or peripheral nerve field stimulation (PNFS).

SUMMARY

The techniques of this disclosure may include one or more processors, e.g., of an external programming device for programming a medical device, configured to analyze sensed neural data in real-time to prompt a patient to provide patient state information for relation to the sensed neural data being collected. Example medical devices include implantable deep brain stimulation (DBS), spinal cord stimulation (SCS), sacral nerve stimulation (SNS), and targeted drug delivery (TDD) devices.

For example, in response to a change in sensed neural data, one or more processors (e.g., a processor arranged in the external programming device, a processor arrange in a medical device, and/or a processor arranged in a remote device) may be configured to prompt the user to select a current patient state from a list of patient states. In some examples, the processing circuitry may be configured to prompt the user to indicate whether the current patient state is positive (e.g., thumbs up) or negative (e.g., thumbs down). Further, the processing circuitry may be configured to determine a patient state and prompt the user to confirm that the determined patient state accurately describes the patient's current state. The one or more processors may associate patient state information (e.g., the selected current state, whether the patient state is positive or negative, or whether the determined patient state accurately describes the patient's current state) with a portion of neural data (e.g., a cluster of neural data).

In this way, a system may assess and/or respond to a change in patient state (e.g., a tremor, a seizure, etc.) faster than systems that rely on sending batches of neural data after a period of time (e.g., a day, a week, a month, etc.), which may improve a therapy provided to the patient. Moreover, prompting the user to provide patient state information (e.g., a selection of a current patient state, an indication of the current state as positive or negative, or a confirmation of a determined state) may increase an accuracy of the association of the patient state information with a portion (e.g, a cluster) of the neural data. Increasing an accuracy of the association of the patient state information may help the system identify a patient state, which may improve a therapy provided by the system.

In one example, this disclosure describes a method for assessment of brain signals of a patient includes determining, by one or more processors, a cluster of neural data occurring at a brain of the patient; outputting, by the one or more processors, a request for a user to provide patient state information for the cluster of the neural data in response to determining that the cluster of the neural data is occurring at the brain of the patient; associating, by the one or more processors, the patient state information with the cluster of the neural data to generate patient assessment information; and outputting, by the one or more processors, the patient assessment information.

In another example, this disclosure describes an external programmer for assessment of brain signals of a patient, the external programmer comprising one or more processors configured to: determine a cluster of neural data occurring at a brain of the patient; output a request for a user to provide patient state information for the cluster of the neural data in response to a determination that the cluster of the neural data is occurring at the brain of the patient; associate the patient state information with the cluster of the neural data to generate patient assessment information; and output the patient assessment information.

In another example, this disclosure describes a system for assessment of brain signals of a patient includes a medical device comprising a processor configured to sense neural data for the patient; and one or more processors configured to: determine a cluster of the neural data occurring at a brain of the patient; output a request for a user to provide patient state information for the cluster of the neural data in response to a determination that the cluster of the neural data is occurring at the brain of the patient; associate the patient state information with the cluster of the neural data to generate patient assessment information; and output the patient assessment information.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
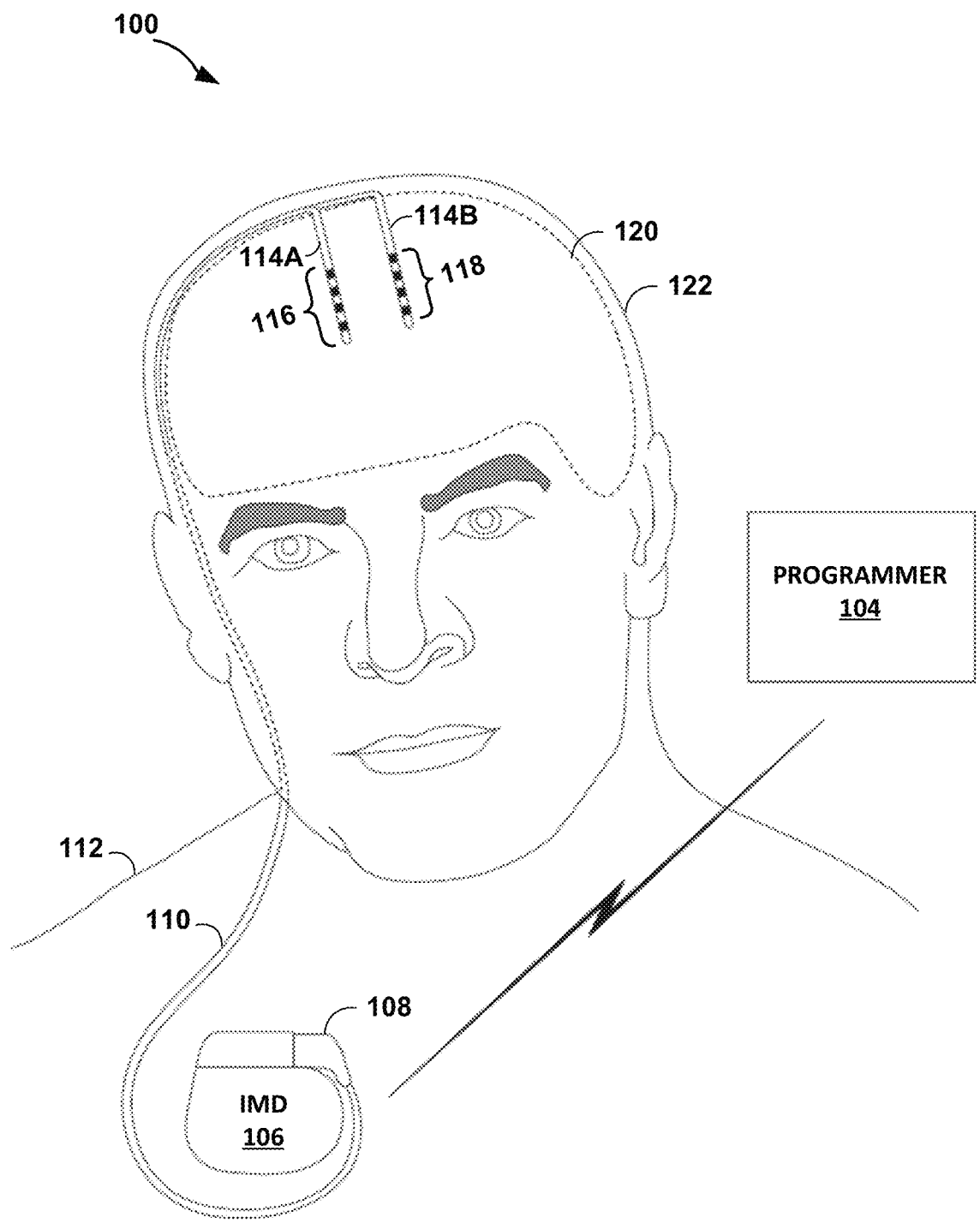
FIG. 1 is a conceptual diagram illustrating an example system that includes an implantable medical device (IMD) according to an example of the techniques of the disclosure.

A medical device, e.g., an implantable or wearable neurostimulator, may generate large volumes of sensed neural data for a patient over a period of time (e.g., days). After collecting the large volumes of neural data, a user (e.g., the patient, a caretaker, or a clinician) may be prompted to provide information to associate patient states to the sensed neural data after the period of time. For instance, the patient may identify a sensory state (e.g., double vision), an emotional state (e.g., anxiety), a speech state, a cognition or memory state, and/or a tremor state (e.g., Parkinson's tremors) for a portion of the sensed neural data. In some instances, the patient may indicate the patient's state in a diary, for example, every 30 minutes. The clinician may determine an efficacy of treatment and/or improve a therapy using the relationship between the neural data and the patient state.

However, an accuracy of a patient state when relying on a diary, which may be after a significant period of time (e.g., days) may be impacted by poor patient recollection. In some examples, the delay in using a diary may result in user inputs that are not very time specific and/or provide for a relatively low resolution of patient state information. For example, an indication that a patient was feeling good may include small portions of time where the patient was not feeling good. Further, the diary may be a burden for the patient, particularly as a number of times the patient is requested to provide a patient state. As used herein, patient state may include, for example, a patient activity level, a good state, a bad state, a sensory state, an emotional state, a tremor state, a seizure state, or side effects.

To address the foregoing, some systems may rely on an accelerometer, which may accurately sense a patient activity level (e.g., an amount of time that a patient is standing). However, systems relying on an accelerometer may not reliably sense side effects, such as, for example, an amount of speech slurring, an anxiety, a cognition or memory level, paresthesia, double vision, or other side effects. Accordingly, such systems may not assess side effects and/or associate neural data with the side effects.

The techniques of this disclosure include one or more processors, e.g., of an external programming device for programming a medical device, configured to analyze sensed neural data in real-time and to detect a meaningful deviation (e.g., identify a cluster of neural data) to prompt the patient to provide patient state information. The one or more processors may report collected neural data and patient state information to a clinician. In some examples, the one or more processors may suggest an optimal therapy based on the cluster of neural data. Example medical devices include implantable deep brain stimulation (DBS), spinal cord stimulation (SCS), sacral nerve stimulation (SNS), and targeted drug delivery (TDD) devices.

For example, in response to a change in sensed neural data, one or more processors (e.g., one or more processors arranged in the external programming device and/or a remote device) may be configured to cluster neural data without collecting patient state information and then trigger collection for each cluster of neural data. In this way, the patient may help label the clusters with patient state information and/or eliminate clusters of neural data resulting from artifacts rather than labeling a predetermined set of time (e.g., a 30 minute period, an hour period, or a day). In some examples, the one or more processors may collect patient state information form the user concurrently (e.g., while the cluster of data is occurring) with detecting the cluster.

For example, the one or more processors may prompt (e.g., after a period of time or concurrently with detecting the cluster) the user to select a current patient state from a list of patient states. In some examples, the one or more processors may be configured to prompt the user to indicate whether the current patient state is positive (e.g., thumbs up) or negative (e.g., thumbs down). Further, the processing circuitry may be configured to determine a patient state and prompt the user to confirm that the determined patient state accurately describes the patient's current state.

The one or more processors may determine clusters of sensed neural data in real-time. For example, a medical device (e.g., an implantable medical device or an external medical device) may sense neural data. The neural data may comprise a beta signal (e.g., a neural oscillation (e.g., brainwave) in the brain with a frequency range of between 12.5 Hz and 30 Hz or 12.5 to 30 cycles per second). In this example, one or more processors (e.g., one or more processors arranged in one or more of an external programmer, the medical device, or a remote device) may determine different clusters of neural data based on different sizes (e.g., an upper threshold and/or a lower threshold) of the beta signal in band identified during an initial programming. In some examples, the one or more processors may determine a cluster of neural data based on a deviation of the neural data of the cluster from baseline neural data for the patient. The one or more processors may determine a cluster of neural data based on unusually large or small beta bands. Further, the one or more processors may determine a cluster of neural data based on a peak beta value persisting over a threshold amount of time. The one or more processors may prompt the user to provide a patient state for the cluster and assign the patient state to the cluster of neural data. The one or more processors may determine the cluster of neural data based on one or more of an energy in the beta band, a ratio of energy between beta bands, or one or more signatures in the beta band.

The one or more processors may apply machine learning techniques to train an artificial neural network using the user selections of a patient state and neural data (e.g., a cluster). For example, the one or more processors may train the artificial neural network using neural data for a plurality of clusters of neural data and, for each cluster, a respective patient state indicated by a user interaction with the external programming device. After training, the artificial neural network may determine a patient state for a cluster of neural data in real-time using the neural network. The determined patient state may be associated with the cluster without user interaction. In some examples, the one or more processors may cause the external programmer to prompt the user to confirm that the patient state matches the patient state determined using the artificial neural network.

A patient may be associated with multiple artificial neural networks. For example, each artificial neural network may be associated with a medication state of a patient. For example, the one or more processors may train and apply a first artificial neural network during treatment of the patient with a first drug and train and apply a second artificial neural network during treatment of the patient with a second drug. In some examples, the one or more processors may cause the external programming device to prompt the user to identify a current medication state of a patient.

The one or more processors may suggest an optimal closed loop treatment strategy based on the relationship between the sensed neural data and the patient state. For example, in response to determining that neural data for a patient is related to a tremor, the one or more processors may suggest a therapy for a tremor, or an adjustment to an existing therapy, such as adjustment to one or more neurostimulation parameters of the therapy.

In this way, a system may assess and/or respond to a change in patient state (e.g., a tremor, a seizure, etc.) faster than systems that rely on sending batches of neural data for after a period of time (e.g., a day, a week, a month, etc.), which may improve a therapy provided to the patient. Moreover, prompting the user to provide patient state information (e.g., a selection of a current patient state, an indication of the current state as positive or negative, or a confirmation of a determined state) may increase an accuracy of the association of the patient state information with a portion (e.g., a cluster) of the neural data. Increasing an accuracy of the association of the patient state information may help the system identify a patient state, which may improve a therapy provided by the system. Furthermore, clusters of the neural data may be automatically determined by the one or more processors (e.g., using an artificial neural network), which may help to increase an accuracy of the association of the patient state information with a portion (e.g., a cluster) of the neural data with potentially less input from the user.

FIG. 1 is a conceptual diagram illustrating an example system 100 that includes an implantable medical device (IMD) 106 configured to deliver adaptive deep brain stimulation (DBS) to a patient 112. DBS may be adaptive in the sense that IMD 106 may adjust, increase, or decrease the magnitude of one or more parameters of the DBS in response to changes in patient activity or movement, a severity of one or more symptoms of a disease of the patient, a presence of one or more side effects due to the DBS, or one or more sensed signals of the patient.

For instance, one example of system 100 is a bi-directional DBS system with capabilities to both deliver stimulation and sense intrinsic neuronal signals. System 100 may analyze sensed neural data in real-time and identify a cluster of neural data to prompt the patient to provide patient state information. System 100 (e.g., external programmer 104) may prompt the patient to collect patient state information concurrently (e.g., while the cluster of data is occurring) with identifying the cluster or may prompt the patient significantly after identifying the cluster (e.g., in response to a batch of clusters exceeding a threshold number of clusters). In some examples, system 100 may provide for "closed-loop" therapy where IMD 106 may continuously assess neural data and deliver stimulation according to pre-programmed routines based on the neural data.

System 100 may be configured to treat a patient condition, such as a movement disorder, neurodegenerative impairment, a mood disorder, or a seizure disorder of patient 112. Patient 112 ordinarily is a human patient. In some cases, however, therapy system 100 may be applied to other mammalian or non-mammalian, non-human patients. While movement disorders and neurodegenerative impairment are primarily referred to herein, in other examples, therapy system 100 may provide therapy to manage symptoms of other patient conditions, such as, but not limited to, seizure disorders (e.g., epilepsy) or mood (or psychological) disorders (e.g., major depressive disorder (MDD), bipolar disorder, anxiety disorders, post-traumatic stress disorder, dysthymic disorder, and obsessive-compulsive disorder (OCD)). At least some of these disorders may be manifested in one or more patient movement behaviors. As described herein, a movement disorder or other neurodegenerative impairment may include symptoms such as, for example, muscle control impairment, motion impairment or other movement problems, such as rigidity, spasticity, bradykinesia, rhythmic hyperkinesia, nonrhythmic hyperkinesia, and akinesia. In some cases, the movement disorder may be a symptom of Parkinson's disease. However, the movement disorder may be attributable to other patient conditions.

Example therapy system 100 includes medical device programmer 104, implantable medical device (IMD) 106, lead extension 110, and leads 114A and 114B with respective sets of electrodes 116, 118. In the example shown in FIG. 1, electrodes 116, 118 of leads 114A, 114B are positioned to deliver electrical stimulation to a tissue site within brain 120, such as a deep brain site under the dura mater of brain 120 of patient 112. In some examples, delivery of stimulation to one or more regions of brain 120, such as the subthalamic nucleus, globus pallidus or thalamus, may be an effective treatment to manage movement disorders, such as Parkinson's disease. Some or all of electrodes 116, 118 also may be positioned to sense neurological brain signals within brain 120 of patient 112. In some examples, some of electrodes 116, 118 may be configured to sense neurological brain signals and others of electrodes 116, 118 may be configured to deliver adaptive electrical stimulation to brain 120. In other examples, all of electrodes 116, 118 are configured to both sense neurological brain signals and deliver adaptive electrical stimulation to brain 120. In some examples, unipolar stimulation may be possible where one electrode is on the housing of IMD 106.

IMD 106 includes a therapy module (e.g., which may include processing circuitry, signal generation circuitry or other electrical circuitry configured to perform the functions attributed to IMD 106) that includes a stimulation generator configured to generate and deliver electrical stimulation therapy to patient 112 via a subset of electrodes 116, 118 of leads 114A and 114B, respectively. The subset of electrodes 116, 118 that are used to deliver electrical stimulation to patient 112, and, in some cases, the polarity of the subset of electrodes 116, 118, may be referred to as a stimulation electrode combination. As described in further detail below, the stimulation electrode combination can be selected for a particular patient 112 and target tissue site (e.g., selected based on the patient condition). The group of electrodes 116, 118 includes at least one electrode and can include a plurality of electrodes. In some examples, the plurality of electrodes 116 and/or 118 may have a complex electrode geometry such that two or more electrodes are located at different positions around the perimeter of the respective lead.

In some examples, the neurological signals sensed within brain 120 may reflect changes in electrical current produced by the sum of electrical potential differences across brain tissue. Examples of neurological brain signals include, but are not limited to, bioelectric signals generated from local field potentials (LFP) sensed within one or more regions of brain 120. Electroencephalogram (EEG) signal or an electrocorticogram (ECoG) signal are also examples of bioelectric signals. For example, neurons generate the bioelectric signals, and if measured at depth, it is LFP, if measured on the coretex, it is ECoG, and if on scalp, it is EEG. In this disclosure, the term "oscillatory signal source" is used to describe a signal source that generates bioelectric signals.

One example of the feature of interest (e.g., biomarker) within the LFPs is synchronized beta frequency band (13-33

Hz) LFP activity recorded within the sensorimotor region of the subthalamic nucleus (STN) in Parkinson's disease patients. The source of the LFP activity can be considered as an oscillatory signal source, within the brain of the patient, that outputs an oscillatory electrical voltage signal that is sensed by one or more of electrodes 116 and/or 118. The suppression of pathological beta activity (e.g., suppression or squelching of the signal component of the bioelectric signals generated from the oscillatory LFP signal source that is within the beta frequency band) by both medication and DBS may correlate with improvements in the motor symptoms of patients who have Parkinson's disease.

In some examples, the neurological brain signals that are used to select a stimulation electrode combination may be sensed within the same region of brain 120 as the target tissue site for the electrical stimulation. As previously indicated, these tissue sites may include tissue sites within anatomical structures such as the thalamus, subthalamic nucleus or globus pallidus of brain 120, as well as other target tissue sites. The specific target tissue sites and/or regions within brain 120 may be selected based on the patient condition. Thus, in some examples, both stimulation electrode combinations and sense electrode combinations may be selected from the same set of electrodes 116, 118. In other examples, the electrodes used for delivering electrical stimulation may be different than the electrodes used for sensing neurological brain signals.

Electrical stimulation generated by IMD 106 may be configured to manage a variety of disorders and conditions. In some examples, the stimulation generator of IMD 106 is configured to generate and deliver electrical stimulation pulses to patient 112 via electrodes of a selected stimulation electrode combination. However, in other examples, the stimulation generator of IMD 106 may be configured to generate and deliver a continuous wave signal, e.g., a sine wave or triangle wave. In either case, a stimulation generator within IMD 106 may generate the electrical stimulation therapy for DBS according to a selected therapy program. In examples in which IMD 106 delivers electrical stimulation in the form of stimulation pulses, a therapy program may include a set of therapy parameter values (e.g., stimulation parameters), such as a stimulation electrode combination for delivering stimulation to patient 112, pulse frequency, pulse width, and a current or voltage amplitude of the pulses. As previously indicated, the electrode combination may indicate the specific electrodes 116, 118 that are selected to deliver stimulation signals to tissue of patient 112 and the respective polarities of the selected electrodes. As described further, the electrical stimulation generated by IMD 106 may generate, for example, burst pulses, interleaved pulses, or concurrent pulses.

In some examples, electrodes 116, 118 may be radially-segmented DBS arrays (rDBSA) of electrodes. Radially-segmented DBS arrays refer to electrodes that are segmented radially along the lead. As one example, leads 114A and 114B may include a first set of electrodes arranged circumferentially around leads 114A and 114B that are all at the same height level on leads 114A and 114B. Each of the electrodes in the first set of electrodes is a separate segmented electrode and form a level of radially-segmented array of electrodes. Leads 114A and 114B may include a second set of electrodes arranged circumferentially around leads 114A and 114B that are all at the same height level on leads 114A and 114B. Each of the electrodes in the first set of electrodes is a separate segmented electrode and form a level of radially-segmented array of electrodes. The rDBSA electrodes may be beneficial for directional stimulation and sensing.

The signal component in the beta frequency band is described as one example, and the techniques are applicable to other types of LFP activity. Furthermore, the example techniques are not limited to examples where electrodes 116, 118 are an rDBSA of electrodes. The example of using rDBSA of electrodes is described as a way of directional stimulation and sensing. However, the example techniques are also useable in examples where directional stimulation and sensing are not available or are not used. Moreover, there may be other ways of performing directional stimulation and sensing that do not require the use of an rDBSA of electrodes.

To suppress the signal component having the beta frequency band from the oscillatory signal source, IMD 106 may output an electrical stimulation signal that alters the way in which neurons of the oscillatory signal source produce signals. For example, the electrical stimulation either directly inhibits a certain neuronal population that includes the oscillatory signal source or excites one group of neurons which in turn suppresses another group of neurons (e.g., network effect). The stimulation may act on the neurons directly, and not necessarily on the signals the neurons (e.g., oscillatory signal source) produces.

IMD 106 may be implanted within a subcutaneous pocket above the clavicle, or, alternatively, on or within cranium 122 or at any other suitable site within patient 112. Generally, IMD 106 is constructed of a biocompatible material that resists corrosion and degradation from bodily fluids. IMD 106 may comprise a hermetic housing to substantially enclose components, such as a processor, therapy module, and memory.

As shown in FIG. 1, implanted lead extension 110 is coupled to IMD 106 via connector 108 (also referred to as a connector block or a header of IMD 106). In the example of FIG. 1, lead extension 110 traverses from the implant site of IMD 106 and along the neck of patient 112 to cranium 122 of patient 112 to access brain 120. In the example shown in FIG. 1, leads 114A and 114B (collectively "leads 114") are implanted within the right and left hemispheres (or in just one hemisphere in some examples), respectively, of patient 112 in order to deliver electrical stimulation to one or more regions of brain 120, which may be selected based on the patient condition or disorder controlled by therapy system 100. The specific target tissue site and the stimulation electrodes used to deliver stimulation to the target tissue site, however, may be selected, e.g., according to the identified patient behaviors and/or other sensed patient parameters. For example, the target tissue site may be the location of the oscillatory signal source that generates the bioelectric signal having a signal component in the beta frequency band. The stimulation electrodes used to deliver stimulation to the target tissue site may be those that are most proximal to the oscillatory signal source, e.g., using the example techniques described in this disclosure. Other lead 114 and IMD 106 implant sites are contemplated. For example, IMD 106 may be implanted on or within cranium 122, in some examples. Leads 114A and 114B may be implanted within the same hemisphere or IMD 106 may be coupled to a single lead implanted in a single hemisphere, in some examples.

Existing lead sets include axial leads carrying ring electrodes disposed at different axial positions and so-called "paddle" leads carrying planar arrays of electrodes. Selection of electrode combinations within an axial lead, a paddle lead, or among two or more different leads presents a challenge to the clinician. In some examples, more complex lead array geometries may be used.

Although leads 114 are shown in FIG. 1 as being coupled to a common lead extension 110, in other examples, leads 114 may be coupled to IMD 106 via separate lead extensions or directly to connector 108. Leads 114 may be positioned to deliver electrical stimulation to one or more target tissue sites within brain 120 to manage patient symptoms associated with a movement disorder of patient 112. Leads 114 may be implanted to position electrodes 116, 118 at desired locations of brain 120 through respective holes in cranium 122. Leads 114 may be placed at any location within brain 120 such that electrodes 116, 118 are capable of providing electrical stimulation to target tissue sites within brain 120 during treatment. For example, electrodes 116, 118 may be surgically implanted under the dura mater of brain 120 or within the cerebral cortex of brain 120 via a burr hole in cranium 122 of patient 112, and electrically coupled to IMD 106 via one or more leads 114.

In the example shown in FIG. 1, electrodes 116, 118 of leads 114 are shown as ring electrodes. Ring electrodes may be used in DBS applications because ring electrodes are relatively simple to program and are capable of delivering an electrical field to any tissue adjacent to electrodes 116, 118. In other examples, electrodes 116, 118 may have different configurations. For example, at least some of the electrodes 116, 118 of leads 114 may have a complex electrode array geometry that is capable of producing shaped electrical fields. The complex electrode array geometry may include multiple electrodes (e.g., partial ring or segmented electrodes) around the outer perimeter of each lead 114, rather than one ring electrode. In this manner, electrical stimulation may be directed in a specific direction from leads 114 to enhance therapy efficacy and reduce possible adverse side effects from stimulating a large volume of tissue.

In some examples, a housing of IMD 106 may include one or more stimulation and/or sensing electrodes. In some examples, leads 114 may have shapes other than elongated cylinders as shown in FIG. 1. For example, leads 114 may be paddle leads, spherical leads, bendable leads, or any other type of shape effective in treating patient 112 and/or minimizing invasiveness of leads 114.

IMD 106 includes a memory to store a plurality of therapy programs that each define a set of therapy parameter values. In some examples, IMD 106 may select a therapy program from the memory based on various parameters, such as sensed patient parameters and the identified patient behaviors. IMD 106 may generate electrical stimulation based on the parameters of the selected therapy program to manage the patient symptoms associated with a movement disorder.

External programmer 104 wirelessly communicates with IMD 106 as needed to provide or retrieve therapy information. Programmer 104 is an external computing device that the user, e.g., a clinician and/or patient 112, may use to communicate with IMD 106. For example, programmer 104 may be a clinician programmer that the clinician uses to communicate with IMD 106 and program one or more therapy programs for IMD 106. Alternatively, programmer 104 may be a patient programmer that allows patient 112 to select programs and/or view and modify therapy parameters. The clinician programmer may include more programming features than the patient programmer. In other words, more complex or sensitive tasks may only be allowed by the clinician programmer to prevent an untrained patient from making undesirable changes to IMD 106.

When programmer 104 is configured for use by the clinician, programmer 104 may be used to transmit initial programming information to IMD 106. This initial information may include hardware information, such as the type of leads 114 and the electrode arrangement, the position of leads 114 within brain 120, the configuration of electrode array 116, 118, initial programs defining therapy parameter values, and any other information the clinician desires to program into IMD 106. Programmer 104 may also be capable of completing functional tests (e.g., measuring the impedance of electrodes 116, 118 of leads 114).

The clinician may also store therapy programs within IMD 106 with the aid of programmer 104. During a programming session, the clinician may determine one or more therapy programs that may provide efficacious therapy to patient 112 to address symptoms associated with the patient condition, and, in some cases, specific to one or more different patient states, such as a sleep state, movement state or rest state. For example, the clinician may select one or more stimulation electrode combinations with which stimulation is delivered to brain 120. During the programming session, the clinician may evaluate the efficacy of the specific program being evaluated based on feedback provided by patient 112 or based on one or more physiological parameters of patient 112 (e.g., muscle activity, muscle tone, rigidity, tremor, etc.). Alternatively, identified patient behavior from video information may be used as feedback during the initial and subsequent programming sessions. Programmer 104 may assist the clinician in the creation/identification of therapy programs by providing a methodical system for identifying potentially beneficial therapy parameter values.

However, in some examples, IMD 106 or programmer 104 (e.g., a medical device), alone or in combination, may automatically determine electrode configuration and therapy parameters. For example, the medical device may determine which electrodes to use for stimulation based on which electrodes are most proximal to the oscillatory signal source. In some examples, programmer 104 may output information indicating the selected electrode configuration for stimulation and the determined stimulation amplitude or other therapy parameter for the clinician or physician to review and confirm before IMD 106 delivers therapy via the selected electrode configuration with the determined stimulation amplitude.

Programmer 104 may also be configured for use by patient 112. When configured as a patient programmer, programmer 104 may have limited functionality (compared to a clinician programmer) in order to prevent patient 112 from altering critical functions of IMD 106 or applications that may be detrimental to patient 112. In this manner, programmer 104 may only allow patient 112 to adjust values for certain therapy parameters or set an available range of values for a particular therapy parameter.

Programmer 104 may also provide an indication to patient 112 when therapy is being delivered, when patient input has triggered a change in therapy or when the power source within programmer 104 or IMD 106 needs to be replaced or recharged. For example, programmer 104 may include an alert LED, may flash a message to patient 112 via a programmer display, generate an audible sound or somatosensory cue to confirm patient input was received, e.g., to indicate a patient state or to manually modify a therapy parameter.

Therapy system 100 may be implemented to provide chronic stimulation therapy to patient 112 over the course of several months or years. However, system 100 may also be employed on a trial basis to evaluate therapy before committing to full implantation. If implemented temporarily, some components of system 100 may not be implanted within patient 112. For example, patient 112 may be fitted with an external medical device, such as a trial stimulator, rather than IMD 106. The external medical device may be coupled to percutaneous leads or to implanted leads via a percutaneous extension. If the trial stimulator indicates DBS system 100 provides effective treatment to patient 112, the clinician may implant a chronic stimulator within patient 112 for relatively long-term treatment.

Although IMD 106 is described as delivering electrical stimulation therapy to brain 120, IMD 106 may be configured to direct electrical stimulation to other anatomical regions of patient 112. Further, an IMD may provide other electrical stimulation such as spinal cord stimulation to treat a movement disorder.

According to the techniques of the disclosure, programmer 104 may be configured to determine a cluster of neural data occurring at a brain of patient 112. For example, programmer 104 may determine a cluster of the neural data based on a beta signal band identified during an initial programming for patient 112. For instance, programmer 104 may determine that a portion of neural data is a cluster of neural data when a beta signal of the portion of neural data is outside of a beta signal band, where the beta signal band is identified (e.g., by programmer 104) during an initial programming for patient 112. For instance, the beta signal band may be neural data for patient 112 that is previously sampled. In some examples, programmer 104 may determine a cluster of the neural data based on a deviation from baseline neural data for patient 112. For instance, programmer 104 may determine that a portion of neural data is a cluster of neural data when a beta signal of the portion is not within a deviation from the baseline neural data for patient 112. For instance, programmer 104 may determine the deviation from the baseline neural data for patient 112 by adding an upper tolerance band (e.g., user specified, pre-programmed, or determined by programmer 104) to the baseline neural data and by subtracting a lower tolerance band (e.g., user specified, pre-programmed, or determined by programmer 104) to the baseline neural data. The baseline neural data may be generated (e.g., by programmer 104) by averaging a set of neural data for patient 112.

In some examples, programmer 104 may determine a cluster of the neural data based on a threshold band of beta values. For instance, programmer 104 may determine that a portion of neural data is a cluster of neural data when an amplitude value of the beta signal of the portion of neural data is outside of a threshold band of beta values. In some examples, programmer 104 may determine a cluster of the neural data based on beta signals of the portion of the neural data exceeding a peak beta value for a threshold amount of time. For instance, programmer 104 may determine that a portion of neural data is a cluster of neural data when an amplitude of the beta signal of the cluster of neural data is greater than an upper peak beta value for a threshold amount of time and/or when an amplitude value of the beta signal of the cluster of neural data is less than a lower peak beta value for a threshold amount of time.

Programmer 104 may output a request for a user to provide patient state information for the cluster of the neural data in response to determining that the cluster of the neural data is occurring at the brain of patient 112. Patient state information may include one or more of a patient state or confirmation of a patient state. For example, programmer 104 may output a list of patient states to associate with a cluster of neural data and may determine the patient state information (e.g., a patient state) based on an indication of a selection of a patient state of the list of patient states. In some examples, programmer 104 may output a request for an indication of whether patient 112 is currently in a determined patient state and determine the patient state information based on an indication of a selection of whether the patient state is in the determined patient state. As described below, the determined patient state may be determined by an artificial neural network or by one or more processors. For instance, programmer 104 may determine the patient state information as the determined state when a user interacts with a user interface of programmer 104 to confirm that the determined patient state is accurate. In some examples, programmer 104 may output a request for an indication of whether a patient state is positive or negative and may determine the patient state information based on an indication of a selection of whether the patient state is positive or negative. In some examples, programmer 104 may output the request for the user to enter the patient state information for the neural data while the cluster of the neural data occurs at the brain or may output the request for the user to enter the patient state information for the neural data after the cluster of the neural data occurs at the brain.

Programmer 104 may apply an artificial neural network to determine patient state information for a cluster of the neural data. The artificial neural network may be trained using a cluster of the neural data and the patient state information. Programmer 104 may confirm that the determined patient state information is accurate using a user input or without further user interaction. For example, programmer 104 may output a request for an indication of whether the patient state information for the cluster of the neural data is accurate. In some examples, programmer 104 may skip or bypass outputting the request for an indication of whether the patient state information for the cluster of the neural data is accurate.

In some examples, the artificial neural network may be associated with a predetermined medication state of the patient. For example, each artificial neural network of a plurality of artificial neural networks may be associated with a medication state of patient 112. For instance, programmer 104 may train and apply a first artificial neural network during treatment of the patient with a first drug and train and apply a second artificial neural network during treatment of the patient with a second drug. In some examples, programmer 104 may prompt the user to identify a current medication state of a patient. The medication state of patient 112 may be determined by programmer 104, may be selected by a user, or may be set by a clinician.

Programmer 104 may associate the patient state information with the cluster of the neural data to generate patient assessment information. For example, programmer 104 may label a cluster (e.g., using metadata) to indicate the patient state. For instance, programmer 104 may label a cluster to indicate "feeling good" or "feeling bad". In another instance, programmer 104 may label a cluster to indicate a tremor or a seizure. Programmer 104 may output the patient assessment information. For example, programmer 104 may output the patient assessment information to a remote device (e.g., a cloud or clinician device).

In this way, system 100 may assess a change in patient state faster than systems that rely on sending batches of neural data for after a period of time (e.g., a day, a week, a month, etc.), which may improve a therapy provided to the patient. Moreover, prompting the user to provide patient state information (e.g., a selection of a current patient state, an indication of the current state as positive or negative, or a confirmation of a determined state) may increase an accuracy of the association of the patient state information with a portion (e.g., a cluster) of the neural data. Increasing an accuracy of the association of the patient state information may help the system identify a patient state, which may improve a therapy provided by the system. Furthermore, clusters of the neural data may be automatically determined by the one or more processors (e.g., using an artificial neural network), which may help to increase an accuracy of the association of the patient state information with a portion (e.g, a cluster) of the neural data with potentially less input from the user.

Programmer 104 may determine a patient therapy recommendation based on the patient assessment information. For example, programmer 104 may determine to change a program for electrical stimulation provided by IMD 106 from a first program associated with a positive state to a second program for mitigating a seizure in response to the patient assessment information indicating that a seizure is occurring or is about to occur at patient 112. In this example, programmer 104 may output the patient therapy recommendation to the patient. For instance, programmer 104 may output a screen asking the patient to confirm that a seizure is occurring at patient 112. Programmer 104 may determine a patient response to the patient therapy recommendation and cause electrical stimulation to the brain of patient 112 based on the patient response. For example, programmer 104 may change to the second program in response to receiving an indication at programmer 104 that patient 112 is experiencing a seizure. In this way, system 100 may respond to a change in patient state (e.g., a tremor, a seizure, etc.) faster than systems that rely on sending batches of neural data for after a period of time (e.g., a day, a week, a month, etc.), which may improve a therapy provided to the patient.

Figure 2:
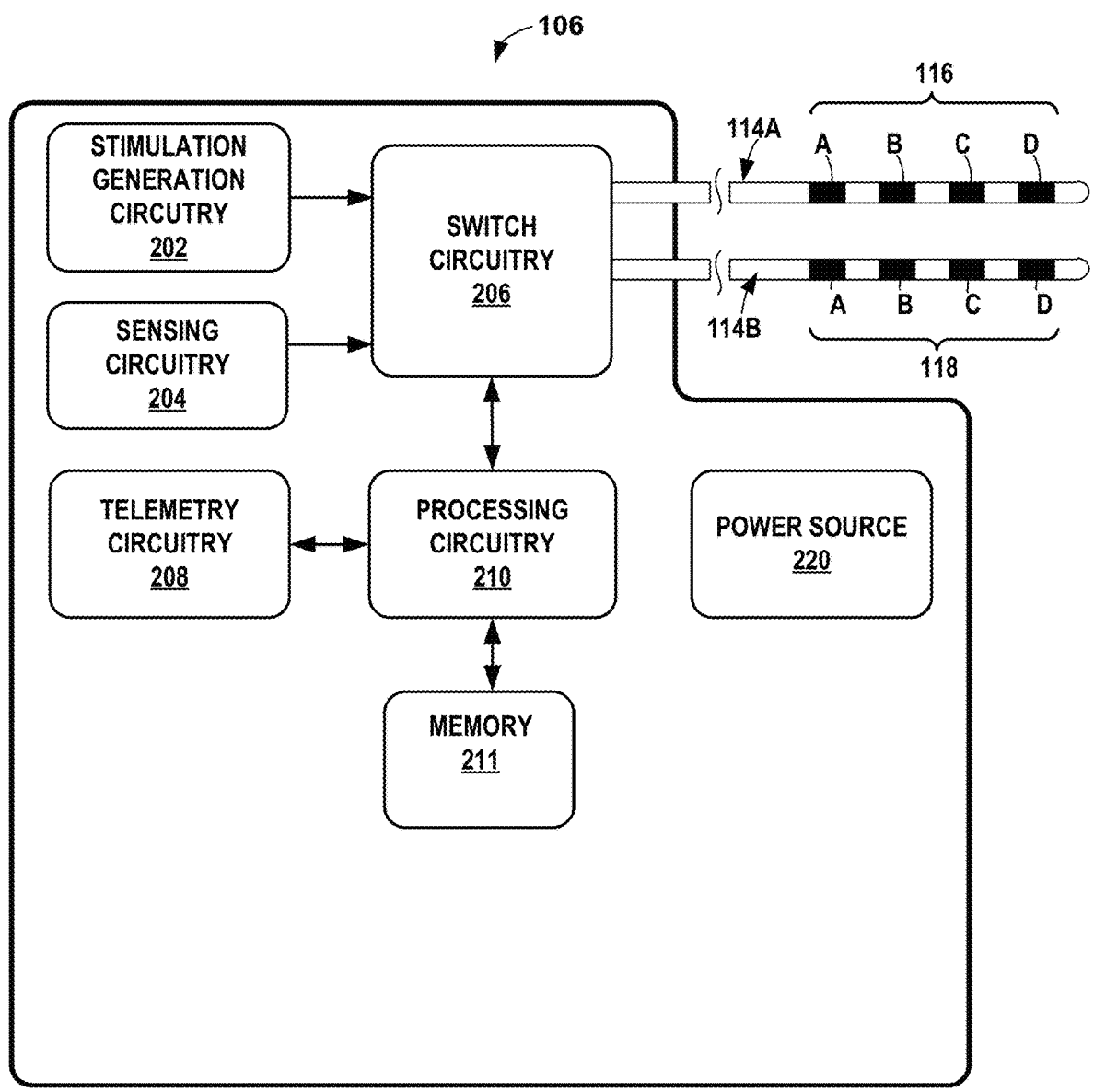
FIG. 2 is a block diagram of the example IMD of FIG. 1 according to an example of the techniques of the disclosure.

FIG. 2 is a block diagram of the example IMD 106 of FIG. 1 for delivering adaptive deep brain stimulation therapy. In the example shown in FIG. 2, IMD 106 includes processing circuitry 210, memory 211, stimulation generation circuitry 202, sensing circuitry 204, switch circuitry 206, telemetry circuitry 208, and power source 220. Each of these circuits may be or include electrical circuitry configured to perform the functions attributed to each respective circuit. Memory 211 may include any volatile or non-volatile media, such as a random-access memory (RAM), read only memory (ROM), non-volatile RAM (NVRAM), electrically erasable programmable ROM (EEPROM), flash memory, and the like. Memory 211 may store computer-readable instructions that, when executed by processing circuitry 210, cause IMD 106 to perform various functions. Memory 211 may be a storage device or other non-transitory medium.

In the example shown in FIG. 2, memory 211 stores program parameters (e.g., a therapy parameter set), such as a stimulation electrode combination, electrode polarity, current or voltage amplitude, pulse width, and pulse rate. In some examples, individual therapy programs may be stored as a therapy group, which defines a set of therapy programs with which stimulation may be generated. The stimulation signals defined by the therapy programs of the therapy group may be delivered together on an overlapping or non-overlapping (e.g., time-interleaved) basis.

Stimulation generation circuitry 202, under the control of processing circuitry 210, generates stimulation signals for delivery to patient 112 via selected combinations of electrodes 116, 118. An example range of electrical stimulation parameters believed to be effective in DBS to manage a movement disorder of patient include:

1. Pulse Rate, i.e., Frequency: between approximately 40 Hertz and approximately 500 Hertz, such as between approximately 90 to 170 Hertz or such as approximately 90 Hertz.
2. In the case of a voltage controlled system, Voltage Amplitude: between approximately 0.1 volts and approximately 50 volts, such as between approximately 2 volts and approximately 3 volts.
3. In the case of a current controlled system, Current Amplitude: between approximately 1 milliamps to approximately 3.5 milliamps, such as between approximately 1.0 milliamps and approximately 1.75 milliamps.
4. Pulse Width: between approximately 50 microseconds and approximately 500 microseconds, such as between approximately 50 microseconds and approximately 200 microseconds.

Accordingly, in some examples, stimulation generation circuitry 202 generates electrical stimulation signals in accordance with the electrical stimulation parameters noted above. Other ranges of therapy parameter values may also be useful, and may depend on the target stimulation site within patient 112. While stimulation pulses are described, stimulation signals may be of any form, such as continuous-time signals (e.g., sine waves) or the like.

Processing circuitry 210 may include fixed function processing circuitry and/or programmable processing circuitry, and may comprise, for example, any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 may control stimulation generation circuitry 202 according to therapy programs 214 stored in memory 211 to apply particular stimulation parameter values specified by one or more of programs, such as voltage amplitude or current amplitude, pulse width, and/or pulse rate.

In the example shown in FIG. 2, the set of electrodes 116 includes electrodes 116A, 116B, 116C, and 116D, and the set of electrodes 118 includes electrodes 118A, 118B, 118C, and 118D. Processing circuitry 210 may control switch circuitry 206 to apply the stimulation signals generated by stimulation generation circuitry 202 to selected combinations of electrodes 116, 118. In particular, switch circuitry 206 may couple stimulation signals to selected conductors within leads 114, which, in turn, deliver the stimulation signals across selected electrodes 116, 118. Switch circuitry 206 may be a switch array, switch matrix, multiplexer, or any other type of switching module configured to selectively couple stimulation energy to selected electrodes 116, 118 and to selectively sense neurological brain signals with selected electrodes 116, 118. Hence, stimulation generation circuitry 202 is coupled to electrodes 116, 118 via switch circuitry 206 and conductors within leads 114. In some examples, however, IMD 106 does not include switch circuitry 206.

Stimulation generation circuitry 202 may be a single channel or multi-channel stimulation generator. In particular, stimulation generation circuitry 202 may be capable of delivering a single stimulation pulse, multiple stimulation pulses, or a continuous signal at a given time via a single electrode combination or multiple stimulation pulses at a given time via multiple electrode combinations. In some examples, however, stimulation generation circuitry 202 and switch circuitry 206 may be configured to deliver multiple channels on a time-interleaved basis. For example, switch circuitry 206 may serve to time divide the output of stimulation generation circuitry 202 across different electrode combinations at different times to deliver multiple programs or channels of stimulation energy to patient 112. Alternatively, stimulation generation circuitry 202 may comprise multiple voltage or current sources and sinks that are coupled to respective electrodes to drive the electrodes as cathodes or anodes. In this example, IMB 106 may not require the functionality of switch circuitry 206 for time-interleaved multiplexing of stimulation via different electrodes.

Electrodes 116, 118 on respective leads 114 may be constructed of a variety of different designs. For example, one or both of leads 114 may include two or more electrodes at each longitudinal location along the length of the lead, such as multiple electrodes, e.g., arranged as segments, at different perimeter locations around the perimeter of the lead at each of the locations A, B, C, and D.

As an example, one or both of leads 114 may include radially-segmented DBS arrays (rDBSA) of electrodes. In the rDBSA, as one example, there may be a first ring electrode of electrodes 116 around the perimeter of lead 114A at a first longitudinal location on lead 114A (e.g., location A). Below the first ring electrode, there may be three segmented electrodes of electrodes 116 around the perimeter of lead 114A at a second longitudinal location on lead 114A (e.g., location B). Below the three segmented electrodes, there may be another set of three segmented electrodes of electrodes 116 around the perimeter of lead 114A at a third longitudinal location of lead 114A (e.g., location C). Below the three segmented electrodes, there may be a second ring electrode of electrodes 116 around the perimeter of lead 114A (e.g., location D). Electrodes 118 may be similarly positioned along lead 114B. An example of rDBSA arrays of electrodes on a lead is described in more detail with respect to FIG. 3.

The above is one example of the rDBSA array of electrodes, and the example techniques should not be considered limited to such an example. There may be other configurations of electrodes for DBS. Moreover, the example techniques are not limited to DBS, and other electrode configurations are possible.

In one example, the electrodes 116, 118 may be electrically coupled to switch circuitry 206 via respective wires that are straight or coiled within the housing of the lead and run to a connector at the proximal end of the lead. In another example, each of the electrodes 116, 118 of the leads 114 may be electrodes deposited on a thin film. The thin film may include an electrically conductive trace for each electrode that runs the length of the thin film to a proximal end connector. The thin film may then be wrapped (e.g., a helical wrap) around an internal member to form the leads 114. These and other constructions may be used to create a lead with a complex electrode geometry.

Although sensing circuitry 204 is incorporated into a common housing with stimulation generation circuitry 202 and processing circuitry 210 in FIG. 2, in other examples, sensing circuitry 204 may be in a separate housing from IMD 106 and may communicate with processing circuitry 210 via wired or wireless communication techniques. Example neurological brain signals include, but are not limited to, a signal generated from local field potentials (LFPs) within one or more regions of brain 120. EEG and ECoG signals are examples of local field potentials that may be measured within brain 120. LFPs, EEG and ECoG may be different measurements of the same bioelectric signals in the brain. The neurons generate the signals, and if measured at depth, it is LFP, if measured on the coretex, it is ECoG, if on the scalp, it is EEG. In general, the bioelectric signals may be formed by one or more oscillatory signal sources. The set of electrodes 116 and 118 that are most proximate to the oscillatory signal sources are good candidates to use for delivering therapy.

Telemetry circuitry 208 supports wireless communication between IMD 106 and an external programmer 104 or another computing device under the control of processing circuitry 210. Processing circuitry 210 of IMD 106 may receive, as updates to programs, values for various stimulation parameters such as magnitude and electrode combination, from programmer 104 via telemetry circuitry 208. The updates to the therapy programs may be stored within therapy programs 214 portion of memory 211. Telemetry circuitry 208 in IMD 106, as well as telemetry modules in other devices and systems described herein, such as programmer 104, may accomplish communication by radiofrequency (RF) communication techniques. In addition, telemetry circuitry 208 may communicate with external medical device programmer 104 via proximal inductive interaction of IMD 106 with programmer 104. Accordingly, telemetry circuitry 208 may send information to external programmer 104 on a continuous basis, at periodic intervals, or upon request from IMD 106 or programmer 104.

Power source 220 delivers operating power to various components of IMD 106. Power source 220 may include a small rechargeable or non-rechargeable battery and a power generation circuit to produce the operating power. Recharging may be accomplished through proximal inductive interaction between an external charger and an inductive charging coil within IMD 106. In some examples, power requirements may be small enough to allow IMD 106 to utilize patient motion and implement a kinetic energy-scavenging device to trickle charge a rechargeable battery. In other examples, traditional batteries may be used for a limited period of time.

In one example, processing circuitry 210 of IMD 106 senses, via electrodes 116, 118 interposed along leads 114 (and sensing circuitry 204), one or more bioelectric signals of brain 120 of patient 112. Further, processing circuitry 210 of IMD 106 delivers, via electrodes 116, 118 (and stimulation generation circuitry 202), electrical stimulation therapy to patient 112 based on the sensed one or more bioelectric signals of brain 120. The adaptive DBS therapy is defined by electrical stimulation information 214. For example, electrical stimulation information 214 may include a current amplitude (for a current-controlled system) or a voltage amplitude (for a voltage-controlled system), a pulse rate or frequency, and a pulse width, or a number of pulses per cycle. In examples where the electrical stimulation is delivered according to a "burst" of pulses, or a series of electrical pulses defined by an "on-time" and an "off-time," the one or more parameters may further define one or more of a number of pulses per burst, an on-time, and an off-time. Processing circuitry 210, via electrodes 116, 118, delivers to patient 112 adaptive DBS and may adjust one or more parameters defining the electrical stimulation based on corresponding parameters of the sensed one or more bioelectric signals of brain 120.

In some examples, processing circuitry 210 may continuously measure the one or more bioelectric signals in real time. In other examples, processing circuitry 210 may periodically sample the one or more bioelectric signals according to a predetermined frequency or after a predetermined amount of time. In some examples, processing circuitry 210 may periodically sample the signal at a frequency of approximately 150 Hertz.

According to the techniques of the disclosure, processing circuitry 210 may be configured to provide electrical stimulation to the brain of patient 112 based on an assessment of brain signals at the brain of patient 112. For example, programmer 104 may generate patient assessment information that indicates a cluster of neural data sensed by sensing circuitry 204 is associated with a tremor. In this example, one or more of programmer 104 and processing circuitry 210 may determine a patient therapy recommendation (e.g., a program) based on the patient assessment information. One or more of programmer 104 and processing circuitry 210 may cause stimulation generation circuitry 202 to provide the electrical stimulation to the brain of patient 112 according to the patient therapy recommendation (e.g., a program). In this way, IMD 106 may respond to a change in patient state (e.g., a tremor, a seizure, etc.) faster than systems that rely on sending batches of neural data for after a period of time (e.g., a day, a week, a month, etc.), which may improve a therapy provided to patient 112.

Figure 3:
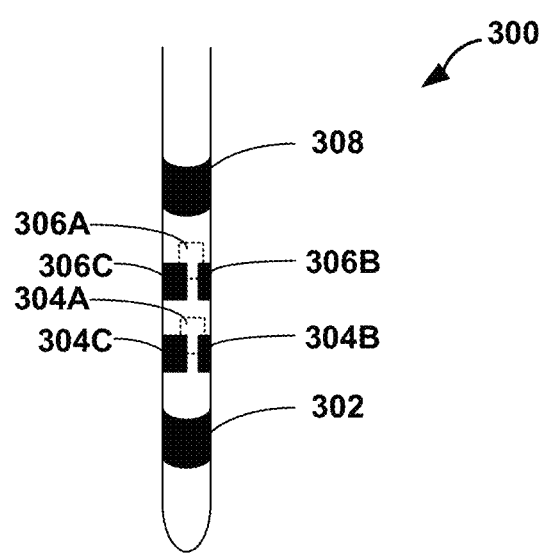
FIG. 3 is a conceptual diagram illustrating an example of a lead with segmented and ring electrodes.

FIG. 3 is a conceptual diagram illustrating an example of a lead 300 with segmented and ring electrodes. Lead 300 is an example of leads 114A and 114B. Processing circuitry 210 may be configured to output electrical signals using, for example, bursts of pulses, interleaved pulses, and/or concurrent pulses at one or more of ring electrode 302, segmented electrodes 304A-304C, segmented electrodes 306A-306C, or ring electrode 308.

The lead radius for lead 300 is approximate 0.66 mm. Lead 300 includes ring electrode 302, segmented electrodes 304A-304C, segmented electrodes 306A-306C, and ring electrode 308. The electrodes on lead 300 may be vertically (e.g., axially) spaced by a distance D (e.g., 2 mm to 3 mm). For example, assume that the z-coordinate for ring electrode 302 is 0. In this example, the z-coordinate for segment electrodes 304A-304C is D, the z-coordinate for segment electrodes 306A-306D is 2D, and the z-coordinate for ring electrode 308 is 3D.

Segmented electrodes 304A-304C may be all at the same vertical level (e.g., axial level), and segmented electrodes 306A-306C may be all at the same vertical level (e.g., axial level). In this example, the angular separation between segmented electrodes 304A-304C may be 120-degrees. Therefore, segmented electrodes 304A and 306A are on the backside of lead 300 and shown in dashed lines.

Figure 4:
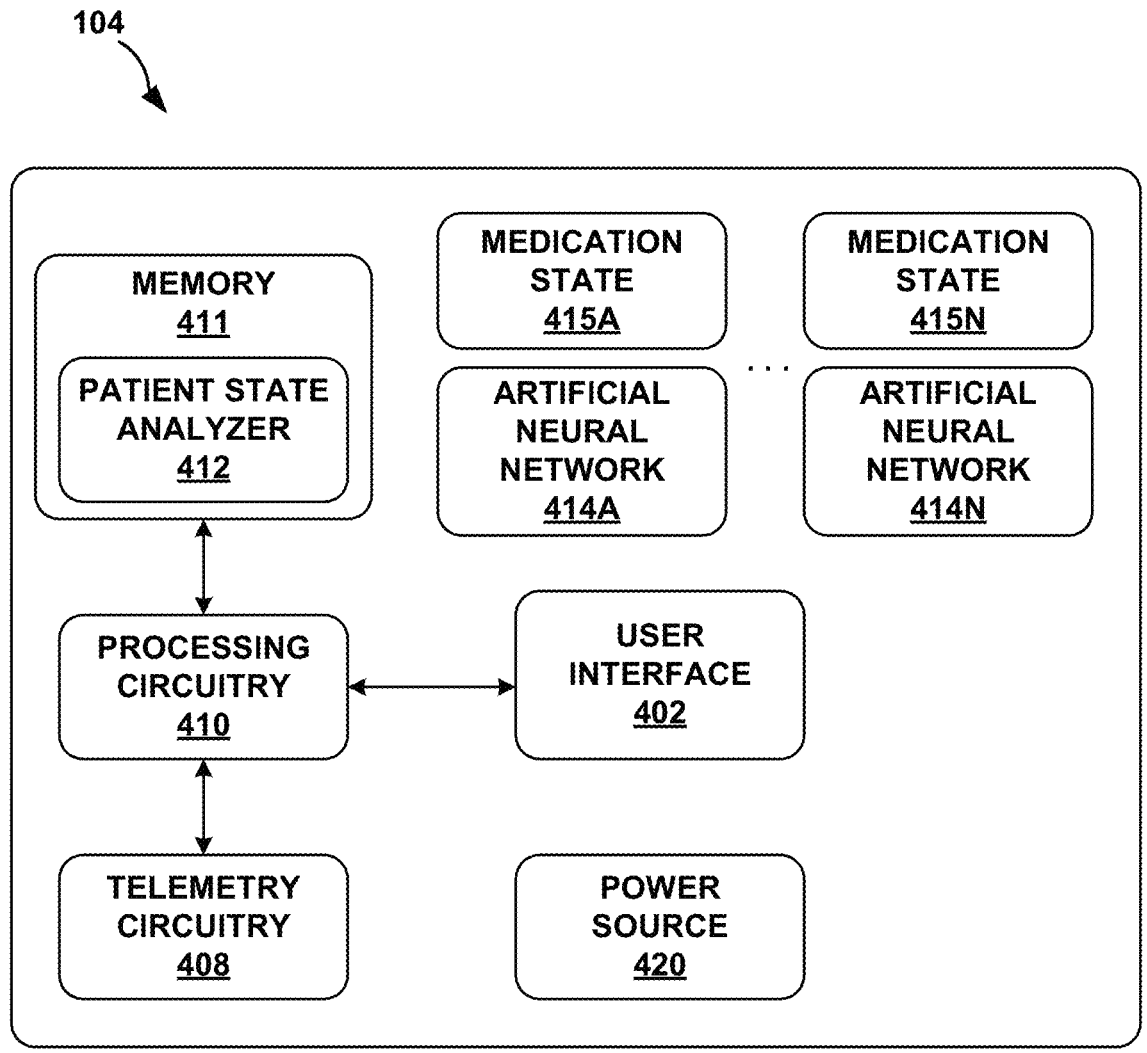
FIG. 4 is a block diagram of the external programmer of FIG. 1 for assessing brain signals of a patient according to an example of the techniques of the disclosure.

FIG. 4 is a block diagram of the external programmer 104 of FIG. 1. Although programmer 104 may generally be described as a hand-held device, programmer 104 may be a larger portable device or a more stationary device. In addition, in other examples, programmer 104 may be included as part of an external charging device or include the functionality of an external charging device. As illustrated in FIG. 4, programmer 104 may include processing circuitry 410, memory 411, user interface 402, telemetry circuitry 408, and power source 420. Memory 411 may store instructions that, when executed by processing circuitry 410, cause processing circuitry 410 and external programmer 104 to provide the functionality ascribed to external programmer 104 throughout this disclosure. Each of these components, or modules, may include electrical circuitry that is configured to perform some or all of the functionality described herein. For example, processing circuitry 410 may include processing circuitry configured to perform the processes discussed with respect to processing circuitry 410.

In general, programmer 104 comprises any suitable arrangement of hardware, alone or in combination with software and/or firmware, to perform the techniques attributed to programmer 104, and processing circuitry 410, user interface 402, and telemetry circuitry 408 of programmer 104. In various examples, programmer 104 may include one or more processors, which may include fixed function processing circuitry and/or programmable processing circuitry, as formed by, for example, one or more microprocessors, DSPs, ASICs, FPGAs, or any other equivalent integrated or discrete logic circuitry, as well as any combinations of such components. Programmer 104 also, in various examples, may include a memory 411, such as RAM, ROM, PROM, EPROM, EEPROM, flash memory, a hard disk, a CD-ROM, comprising executable instructions for causing the one or more processors to perform the actions attributed to them. Moreover, although processing circuitry 410 and telemetry circuitry 408 are described as separate modules, in some examples, processing circuitry 410 and telemetry circuitry 408 may be functionally integrated with one another. In some examples, processing circuitry 410 and telemetry circuitry 408 correspond to individual hardware units, such as ASICs, DSPs, FPGAs, or other hardware units.

Memory 411 (e.g., a storage device) may store instructions that, when executed by processing circuitry 410, cause processing circuitry 410 and programmer 104 to provide the functionality ascribed to programmer 104 throughout this disclosure. For example, memory 411 may include instructions that cause processing circuitry 410 to obtain a parameter set from memory or receive a user input and send a corresponding command to IMD 106, or instructions for any other functionality. In addition, memory 411 may include a plurality of programs, where each program includes a parameter set that defines stimulation therapy.

User interface 402 may include a button or keypad, lights, a speaker for voice commands, a display, such as a liquid crystal (LCD), light-emitting diode (LED), or organic light-emitting diode (OLED). In some examples the display may be a touch screen. User interface 402 may be configured to display any information related to the delivery of stimulation therapy, identified patient behaviors, sensed patient parameter values, patient behavior criteria, or any other such information. User interface 402 may also receive user input. The input may be, for example, in the form of pressing a button on a keypad or selecting an icon from a touch screen.

Telemetry circuitry 408 may support wireless communication between IMD 106 and programmer 104 under the control of processing circuitry 410. Telemetry circuitry 408 may also be configured to communicate with another computing device via wireless communication techniques, or direct communication through a wired connection. In some examples, telemetry circuitry 408 provides wireless communication via an RF or proximal inductive medium. In some examples, telemetry circuitry 408 includes an antenna, which may take on a variety of forms, such as an internal or external antenna.

Examples of local wireless communication techniques that may be employed to facilitate communication between programmer 104 and IMD 106 include RF communication according to the 802.11 or Bluetooth specification sets or other standard or proprietary telemetry protocols. In this manner, other external devices may be capable of communicating with programmer 104 without needing to establish a secure wireless connection.

In some examples, processing circuitry 410 of external programmer 104 defines the parameters of electrical stimulation therapy, stored in memory 411, for delivering adaptive DBS to patient 112. In one example, processing circuitry 410 of external programmer 104, via telemetry circuitry 408, issues commands to IMD 106 causing IMD 106 to deliver electrical stimulation therapy via electrodes 116, 118 via leads 114.

In accordance with the techniques of the disclosure, processing circuitry 410, with patient state analyzer 412, may be configured to determine a cluster of neural data occurring at a brain of patient 112. For example, processing circuitry 410, with patient state analyzer 412, may determine a cluster of the neural data based on a beta signal band identified during an initial programming for patient 112. For instance, processing circuitry 410, with patient state analyzer 412, may determine that a portion of neural data is a cluster of neural data when a beta signal of the portion of neural data is outside of a beta signal band, where the beta signal band is identified (e.g., by processing circuitry 410, with patient state analyzer 412) during an initial programming for patient 112. For instance, the beta signal band may be neural data for patient 112 that is previously sampled.

In some examples, processing circuitry 410, with patient state analyzer 412, may determine a cluster of the neural data based on a deviation (e.g., an abnormality) from baseline neural data for patient 112 that are non-artifact. For instance, processing circuitry 410, with patient state analyzer 412, may determine that a portion of neural data is a cluster of neural data when a beta signal of the portion is not within a deviation from the baseline neural data for patient 112 (e.g., unusually large or unusually small beta bands). For instance, processing circuitry 410, with patient state analyzer 412, may determine the deviation from the baseline neural data for patient 112 by adding an upper tolerance band (e.g., user specified, pre-programmed, or determined by programmer 104) to the baseline neural data and by subtracting a lower tolerance band (e.g., user specified, pre-programmed, or determined by programmer 104) to the baseline neural data. The baseline neural data may be generated (e.g., by processing circuitry 410, with patient state analyzer 412,) by averaging a set of neural data for patient 112.

In some examples, processing circuitry 410, with patient state analyzer 412, may determine a cluster of the neural data based on a threshold band of beta values (e.g., that are set by a clinician or determined by processing circuitry 410). For instance, processing circuitry 410, with patient state analyzer 412, may determine that a portion of neural data is a cluster of neural data when an amplitude value of the beta signal of the portion of neural data is outside of a threshold band of beta values.

Processing circuitry 410, with patient state analyzer 412, may determine a cluster of the neural data based on beta signals of the portion of the neural data exceeding a peak beta value for a threshold amount of time. For instance, processing circuitry 410, with patient state analyzer 412, may determine that a portion of neural data is a cluster of neural data when a LFP significant peak of the cluster of neural data is greater than an upper peak beta value for a threshold amount of time and/or when an amplitude value of the beta signal of the cluster of neural data is less than a lower peak beta value for a threshold amount of time.

Processing circuitry 410, with user interface 402, may output a request for a user to provide patient state information for the cluster of the neural data in response to determining that the cluster of the neural data is occurring at the brain of patient 112. Patient state information may include one or more of a tremor, a gait, bradikinesia, a request for patient 112 to say certain sentences and/or words and record for manual or automatic speech analysis, menstrual cycle changes, a time of day, or an activity. In some examples, processing circuitry 410 may request for the user to provide the patient state information only when patient is awake (e.g., as measured by other markers or by measure of time). Processing circuitry 410 may prompt patient 112 or a caregiver for other aspects of state. Processing circuitry 410 may request for the user to provide a medication state about which drugs patient 112 has been taking and dose and when. In some examples, processing circuitry 410 may record additional data from the patient, such as, for example, a more complete snapshot of data (e.g. full spectrum instead of just beta; more channels; perhaps pause stimulation or process neural data on and off). User interface 402 may include a graphical display of various signals observed, as well as symptoms identified as associated with those anomalies. User interface 402 may display an indication of a stimulation state associated with anomalies. In some examples, user interface 402 may suggest appropriate thresholds for adaptive stimulation based on symptoms reported.

For example, processing circuitry 410, with user interface 402, may output a list of patient states to associate with a cluster of neural data and may determine the patient state information (e.g., a patient state) based on an indication of a selection of a patient state of the list of patient states. In some examples, processing circuitry 410, with user interface 402, may output a request for an indication of whether patient 112 is currently in a determined patient state and determine the patient state information based on an indication of a selection of whether the patient state is in the determined patient state.

As described below, the determined patient state may be determined by an artificial neural network or by one or more processors. For instance, processing circuitry 410 may determine the patient state information as the determined state when a user interacts with user interface 402 to confirm that the determined patient state is accurate. In some examples, processing circuitry 410, with user interface 402, may output a request for an indication of whether a patient state is positive or negative and may determine the patient state information based on an indication of a selection of whether the patient state is positive or negative. In some examples, processing circuitry 410, with user interface 402, may output the request for the user to enter the patient state information for the neural data while the cluster of the neural data occurs at the brain or may output the request for the user to enter the patient state information for the neural data after the cluster of the neural data occurs at the brain.

Processing circuitry 410, with patient state analyzer 412, may request for an entire set of questions and/or have a targeted list of questions selected based on the neural data (e.g., beta signals). For example, processing circuitry 410, with user interface 402, may provide a free form text entry for the patient state. Processing circuitry 410, with user interface 402, may provide icons for one or more of a good patient state, a bad patient state, a like of the patient state, a dislike of the patient state, a thumbs up of the patient state, or a thumbs down of the patient state. Processing circuitry 410, with user interface 402, may provide a list of questions that could be different for different clusters and could be refined over time. In some examples, processing circuitry 410, with user interface 402, may provide leading questions (e.g., "Is there a tremor on your left arm. Yes/No?") of an inferred patient state to be confirmed or denied by patient 112 or a user.

Processing circuitry 410 and/or artificial neural networks 414 may determine a confidence level for a determined patient state exceeds a threshold such that processing circuitry 410 may stop asking questions and may automatically (e.g., without user input) detect therapy. In some examples, processing circuitry 410 and/or artificial neural networks 414 may allow a user to start or restart a learning process. Processing circuitry 410 and/or artificial neural networks 414 may save multiple learning cycles (e.g., a learning cycle for medication state 415A, a learning cycle for medication state 415B, a learning cycle for no drugs, etc.). Processing circuitry 410 and/or artificial neural networks 414 may inquire about current drug state for patient 112 and load a signature for a prior learning cycle or a medication state could be a state parameter.

Processing circuitry 410, with patient state analyzer 412, may apply one or more of artificial neural networks 414A-414N (collectively, "artificial neural networks 414") to determine patient state information for a cluster of the neural data. While the following examples apply artificial neural network 414A, the examples may apply to any combination of artificial neural networks 414. As shown, each one of artificial neural networks 414 may be associated with a respective medication state of medication states 415A-415N (collectively, "medication states 415"). For example, each artificial neural network of artificial neural networks 414 may be associated with a medication state of patient 112. For instance, processing circuitry 410, with patient state analyzer 412, may train and apply artificial neural network 414A during treatment of patient 112 with mediation state 415A (e.g., treatment with a first set of drugs) and train and apply artificial neural network 414N during treatment of patient 112 with medication state 415N (e.g., treatment with a second set of drugs). In some examples, processing circuitry 410, with patient state analyzer 412, may prompt the user to identify a current medication state of patient 112 from medication states 415.

Artificial neural network 414A may be trained using a cluster of the neural data and the patient state information. Processing circuitry 410, with patient state analyzer 412, may confirm that the determined patient state information is accurate using a user input or without further user interaction. For example, processing circuitry 410, with patient state analyzer 412, may output a request for an indication of whether the patient state information for the cluster of the neural data is accurate. In some examples, processing circuitry 410, with patient state analyzer 412, may skip outputting the request for an indication of whether the patient state information for the cluster of the neural data is accurate.

Processing circuitry 410, with patient state analyzer 412, may associate the patient state information with the cluster of the neural data to generate patient assessment information. For example, processing circuitry 410, with patient state analyzer 412, may label a cluster (e.g., using metadata) to indicate the patient state. For instance, processing circuitry 410, with patient state analyzer 412, may label a cluster to indicate "feeling good" or "feeling bad". In another instance, processing circuitry 410, with patient state analyzer 412, may label a cluster to indicate a tremor or a seizure. Processing circuitry 410, with patient state analyzer 412, may output the patient assessment information. For example, processing circuitry 410, with patient state analyzer 412, may output the patient assessment information to a remote device (e.g., a cloud or clinician device). In some examples, processing circuitry 410, with patient state analyzer 412, may develop a surface model (e.g., a genetic algorithm) based on feedback, changes in brain signals, patient state, and patient input.

In this way, processing circuitry 410, with patient state analyzer 412, may assess a change in patient state faster than systems that rely on sending batches of neural data for after a period of time (e.g., a day, a week, a month, etc.), which may improve a therapy provided to the patient. Moreover, prompting the user to provide patient state information (e.g., a selection of a current patient state, an indication of the current state as positive or negative, or a confirmation of a determined state) may increase an accuracy of the association of the patient state information with a portion (e.g, a cluster) of the neural data. Increasing an accuracy of the association of the patient state information may help the system identify a patient state, which may improve a therapy provided by the system. Furthermore, clusters of the neural data may be automatically determined by the one or more processors (e.g., using an artificial neural network), which may help to increase an accuracy of the association of the patient state information with a portion (e.g, a cluster) of the neural data with potentially less input from the user.

Processing circuitry 410, with patient state analyzer 412, may determine a patient therapy recommendation based on the patient assessment information. For example, processing circuitry 410, with patient state analyzer 412, may determine to change a program for electrical stimulation provided by IMD 106 from a first program associated with a positive state to a second program for mitigating a seizure in response to the patient assessment information indicating that a seizure is occurring or is about to occur at patient 112. In this example, processing circuitry 410, with patient state analyzer 412, may output the patient therapy recommendation to the patient. For instance, processing circuitry 410, with patient state analyzer 412, may output a screen asking the patient to confirm that a seizure is occurring at patient 112.

Processing circuitry 410, with patient state analyzer 412, may determine a patient response to the patient therapy recommendation and cause electrical stimulation to the brain of patient 112 based on the patient response. For example, processing circuitry 410, with patient state analyzer 412, may change to the second program in response to receiving an indication at processing circuitry 410, with patient state analyzer 412, that patient 112 is experiencing a seizure. In this way, system 100 may respond to a change in patient state (e.g., a tremor, a seizure, etc.) faster than systems that rely on sending batches of neural data for after a period of time (e.g., a day, a week, a month, etc.), which may improve a therapy provided to the patient.

Figure 5:
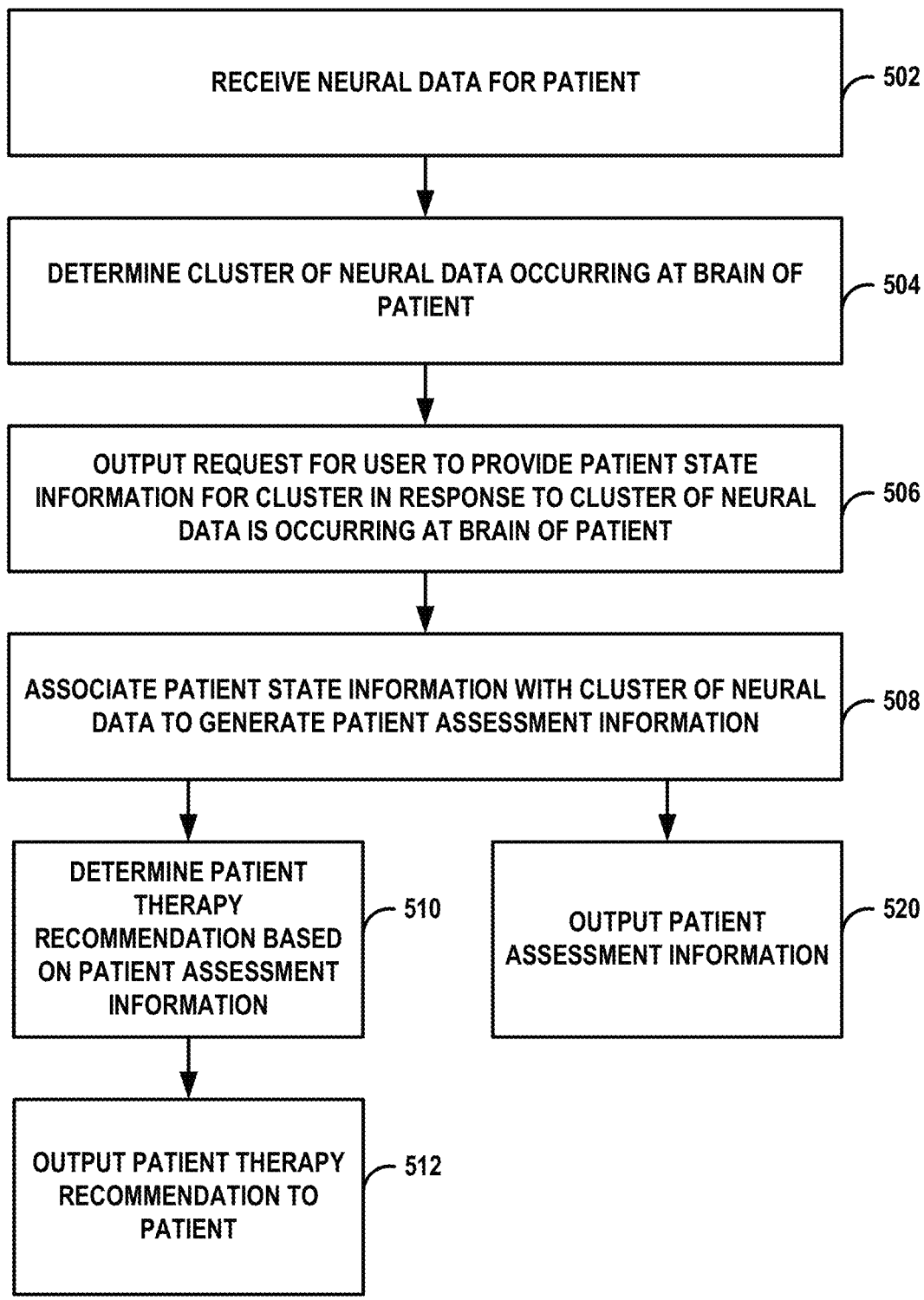
FIG. 5 is a flowchart illustrating an example method for assessing brain signals of a patient in accordance with techniques of the disclosure.

FIG. 5 is a flowchart illustrating an example method for assessing brain signals of a patient in accordance with techniques of the disclosure. For ease of description, the example of FIG. 15 is described with respect to processing circuitry 410 of programmer 104, but may be performed by processing circuitry 210 of IMD 210, a remote device, or possibly one or more of programmer 104, IMD 210, or a remote device.

Processing circuitry 410, with telemetry circuitry 408 may receive neural data for a patient. For example, processing circuitry 410, with telemetry circuitry 408 may receive from IMD 110 the neural data for patient 112. Processing circuitry 410 may determine a cluster of neural data occurring at a brain of the patient (504). For example, processing circuitry 410 may determine the cluster based on one or more of a beta signal band identified during an initial programming for the patient, a deviation from baseline neural data for the patient, or the cluster of the neural data exceeding a peak beta value for a threshold amount of time.

Processing circuitry 410, with user interface 402, may output a request for a user to provide patient state information for the cluster of the neural data in response to a determination that the cluster of the neural data is occurring at the brain of the patient (506). For example, the processing circuitry 410 may cause user interface 402 to present a screen requesting that the user (e.g., a clinician, a caretaker of patient 112, or patient 112) interact with user interface 402 to indicate a selection of one or more of a patient state from a list of patient states, a confirmation that a determined patient state is accurate, or an indication of whether a patient state is positive or negative.

Processing circuitry 410 may associate the patient state information with the cluster of the neural data to generate patient assessment information (508). For example, processing circuitry 410 may generate the patient assessment information to include a label identifying the patient state information for the cluster of the neural data. Processing circuitry 410 may output the patient assessment information (520). For example, processing circuitry 410, with telemetry circuitry 408, may output the patient assessment information to a clinician device.

In this way, processing circuitry 410 may assess a change in patient state faster than systems that rely on sending batches of neural data for after a period of time (e.g., a day, a week, a month, etc.), which may improve a therapy provided to the patient. Moreover, prompting the user to provide patient state information (e.g., a selection of a current patient state, an indication of the current state as positive or negative, or a confirmation of a determined state) may increase an accuracy of the association of the patient state information with a portion (e.g, a cluster) of the neural data. Increasing an accuracy of the association of the patient state information may help the system identify a patient state, which may improve a therapy provided by the system. Furthermore, clusters of the neural data may be automatically determined by the one or more processors (e.g., using an artificial neural network), which may help to increase an accuracy of the association of the patient state information with a portion (e.g, a cluster) of the neural data with potentially less input from the user.

In some examples, processing circuitry 410 may determine a patient therapy recommendation based on the patient assessment information (510). For example, processing circuitry 410, with patient state analyzer 412, may determine to change a program for electrical stimulation provided by IMD 106 from a first program associated with a positive state to a second program for mitigating a seizure in response to the patient assessment information indicating that a seizure is occurring or is about to occur at patient 112. In this example, processing circuitry 410 may output the patient therapy recommendation to the patient (512). For instance, processing circuitry 410, with patient state analyzer 412, may output a screen asking the patient to confirm that a seizure is occurring at patient 112. Processing circuitry 410 may determine a patient response to the patient therapy recommendation and cause electrical stimulation to the brain of patient 112 based on the patient response. For example, processing circuitry 410 may change to the second program in response to receiving an indication at processing circuitry 410 that patient 112 is experiencing a seizure. In this way, processing circuitry 410 may respond to a change in patient state (e.g., a tremor, a seizure, etc.) faster than systems that rely on sending batches of neural data for after a period of time (e.g., a day, a week, a month, etc.), which may improve a therapy provided to the patient.

The following examples are a non-limiting list of examples in accordance with one or more techniques of this disclosure.

Example 1: A system for assessment of brain signals of a patient, the system comprising one or more processors configured to: determine a cluster of the neural data occurring at a brain of the patient; output a request for a user to provide patient state information for the cluster of the neural data in response to a determination that the cluster of the neural data is occurring at the brain of the patient; associate the patient state information with the cluster of the neural data to generate patient assessment information; and output the patient assessment information.

Example 2: The system of example 1, wherein the one or more processors are further configured to: determine a patient therapy recommendation based on the patient assessment information; and output the patient therapy recommendation to the patient.

Example 3: The system of example 2, wherein the one or more processors are further configured to: determine a patient response to the patient therapy recommendation; and cause a delivery of electrical stimulation to the brain of the patient based on the patient response.

Example 4: The system of any of examples 1 through 3, wherein, to output the request for the user to enter the patient state information for the cluster of the neural data, the one or more processors are configured to output a list of patient states and wherein the one or more processors are further configured to determine the patient state information based on an indication of a selection of a patient state of the list of patient states.

Example 5: The system of any of examples 1 through 4, wherein, to output the request for the user to enter the patient state information for the cluster of the neural data, the one or more processors are configured to output a request for an indication of whether the patient is currently in a determined patient state and wherein the one or more processors are further configured to determine the patient state information based on an indication of a selection of whether the patient state is in the determined patient state.

Example 6: The system of any of examples 1 through 5, wherein, to output the request for the user to enter the patient state information for the cluster of the neural data, the one or more processors are configured to output a request for an indication of whether a patient state is positive or negative and wherein the one or more processors are further configured to determine the patient state information based on an indication of a selection of whether the patient state is positive or negative.

Example 7: The system of any of examples 1 through 6, wherein the one or more processors are configured to output the request for the user to enter the patient state information for the neural data while the cluster of the neural data occurs at the brain.

Example 8: The system of any of examples 1 through 7, wherein the one or more processors are configured to determine the cluster of the neural data based on a beta signal band identified during an initial programming for the patient.

Example 9: The system of any of examples 1 through 8, wherein the one or more processors are configured to determine the cluster of the neural data based on a deviation from baseline neural data for the patient.

Example 10: The system of any of examples 1 through 9, wherein the one or more processors are configured to determine the cluster of the neural data based on a threshold band of beta values.

Example 11: The system of any of examples 1 through 10, wherein the one or more processors are configured to determine the cluster of the neural data based on the cluster of the neural data exceeding a peak beta value for a threshold amount of time.

Example 12: The system of any of examples 1 through 11, wherein the one or more processors are further configured to: train an artificial neural network using the cluster of the neural data and the patient state information; and apply the artificial neural network to determine subsequent patient state information for a subsequent cluster of the neural data.

Example 13: The system of example 12, wherein the one or more processors are further configured to: output a request for an indication of whether the subsequent patient state information for the subsequent cluster of the neural data is accurate; in response to an indication of a selection that the subsequent patient state information is accurate, associate the subsequent patient state information with the subsequent cluster of the neural data to generate subsequent patient assessment information; and output the subsequent patient assessment information.

Example 14: The system of example 12, wherein the one or more processors are further configured to: associate, without interaction with the user, the subsequent patient state information with the subsequent cluster of the neural data to generate subsequent patient assessment information; and output, without interaction with the user, the subsequent patient assessment information.

Example 15: The system of any of examples 12 through 14, wherein the artificial neural network is associated with a predetermined medication state of the patient and wherein the one or more processors are configured to apply the artificial neural network in response to determining that a current medication state of the patient corresponds to the predetermined medication state of the patient.

Example 16: The system of any of examples 1 through 15, wherein, to associate the patient state information with the cluster of the neural data, the one or more processors are configured to generate the patient assessment information to include a label identifying the patient state information for the cluster of the neural data.

Example 17: The system of any of examples 1 through 16, wherein the one or more processors are arranged in an external programmer associated with the patient.

Example 18: The system of example 17, wherein the one or more processors are arranged in an external programmer associated with a medical device comprising a processor configured to sense neural data for the patient.

Example 19: An external programmer for assessment of brain signals of a patient, the external programmer comprising one or more processors configured to: determine a cluster of neural data occurring at a brain of the patient; output a request for a user to provide patient state information for the cluster of the neural data in response to a determination that the cluster of the neural data is occurring at the brain of the patient; associate the patient state information with the cluster of the neural data to generate patient assessment information; and output the patient assessment information.

Example 20: A method for assessment of brain signals of a patient includes determining, by one or more processors, a cluster of neural data occurring at a brain of the patient; outputting, by the one or more processors, a request for a user to provide patient state information for the cluster of the neural data in response to determining that the cluster of the neural data is occurring at the brain of the patient; associating, by the one or more processors, the patient state information with the cluster of the neural data to generate patient assessment information; and outputting, by the one or more processors, the patient assessment information.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system for assessment of brain signals of a patient, the system comprising one or more processors configured to:
   receive neural data from the brain signals of the patient;
   determine a cluster of neural data from the received neural data based on one or more criteria, the cluster of neural data representing a portion of the received neural data;
   output a request for a user to provide patient state information for the cluster of neural data;
   associate the patient state information with the cluster of neural data to generate patient assessment information; and
   output the patient assessment information.

2. The system of claim 1, wherein the one or more processors are further configured to:

determine a patient therapy recommendation based on the patient assessment information; and output the patient therapy recommendation to the patient.

3. The system of claim 2, wherein the one or more processors are further configured to:

determine a patient response to the patient therapy recommendation; and cause a delivery of electrical stimulation to the brain of the patient based on the patient response.

4. The system of claim 1, wherein, to output the request for the user to enter the patient state information for the cluster of neural data, the one or more processors are configured to output a list of patient states, and wherein the one or more processors are further configured to determine the patient state information based on an indication of a selection of a patient state of the list of patient states.

5. The system of claim 1, wherein, to output the request for the user to enter the patient state information for the cluster of neural data, the one or more processors are configured to output a request for an indication of whether the patient is currently in a determined patient state, and wherein the one or more processors are further configured to determine the patient state information based on an indication of a selection of whether the patient state is in the determined patient state.

6. The system of claim 1, wherein, to output the request for the user to enter the patient state information for the cluster of neural data, the one or more processors are configured to output a request for an indication of whether a patient state is positive or negative, and wherein the one or more processors are further configured to determine the patient state information based on an indication of a selection of whether the patient state is positive or negative.

7. The system of claim 1, wherein the one or more processors are configured to output the request for the user to enter the patient state information for the cluster of neural data concurrently with determining the cluster of neural data.

8. The system of claim 1, wherein to determine the cluster of neural data based on the one or more criteria, the one or more processors are configured to determine the cluster of neural data based on a beta signal band identified during an initial programming for the patient.

9. The system of claim 1, wherein to determine the cluster of neural data based on the one or more criteria, the one or more processors are configured to determine the cluster of neural data based on a deviation from baseline neural data for the patient.

10. The system of claim 1, wherein to determine the cluster of neural data based on the one or more criteria, the one or more processors are configured to determine the cluster of neural data based on the cluster of neural data meeting a threshold band of beta values.

11. The system of claim 1, wherein to determine the cluster of neural data based on the one or more criteria, the one or more processors are configured to determine the cluster of neural data based on the cluster of the neural data exceeding a peak beta value for a threshold amount of time.

12. The system of claim 1, wherein the one or more processors are further configured to:

train an artificial neural network using the cluster of neural data and the patient state information; and apply the artificial neural network to determine subsequent patient state information for a subsequent cluster of neural data.

13. The system of claim 12, wherein the one or more processors are further configured to:

output a request for an indication of whether the subsequent patient state information for the subsequent cluster of neural data is accurate;

in response to an indication of a selection that the subsequent patient state information is accurate, associate the subsequent patient state information with the subsequent cluster of neural data to generate subsequent patient assessment information; and output the subsequent patient assessment information.

14. The system of claim 12, wherein the one or more processors are further configured to:

associate, without interaction with the user, the subsequent patient state information with the subsequent cluster of neural data to generate subsequent patient assessment information; and output, without interaction with the user, the subsequent patient assessment information.

15. The system of claim 12, wherein the artificial neural network is associated with a predetermined medication state of the patient and wherein the one or more processors are configured to apply the artificial neural network in response to determining that a current medication state of the patient corresponds to the predetermined medication state of the patient.

16. The system of claim 1, wherein, to associate the patient state information with the cluster of neural data, the one or more processors are configured to generate the patient assessment information to include a label identifying the patient state information for the cluster of neural data.

17. The system of claim 1, wherein the one or more processors are arranged in an external programmer associated with the patient.

18. The system of claim 17, wherein the one or more processors are arranged in an external programmer associated with a medical device comprising a processor configured to sense the brain signals of the patient.

19. An external programmer for assessment of brain signals of a patient, the external programmer comprising one or more processors configured to:

receive neural data from the brain signals of the patient;

determine a cluster of neural data from the received neural data based on one or more criteria, the cluster of neural data representing a portion of the received neural data;

output a request for a user to provide patient state information for the cluster of neural data;

associate the patient state information with the cluster of neural data to generate patient assessment information; and output the patient assessment information.

20. A method for assessment of brain signals of a patient, the method comprising:

receiving, by one or more processors, neural data from the brain signals of the patient;

determining, by the one or more processors, a cluster of neural data from the received neural data based on one or more criteria, the cluster of neural data representing a portion of the received neural data;

outputting, by the one or more processors, a request for a user to provide patient state information for the cluster of neural data;

associating, by the one or more processors, the patient state information with the cluster of neural data to generate patient assessment information; and outputting, by the one or more processors, the patient assessment information.

* * * * *